March 10, 1970     S. LEHRER     3,499,718
STEADY INTENSITY INCANDESCENT LIGHT SOURCE
Filed Nov. 3, 1967
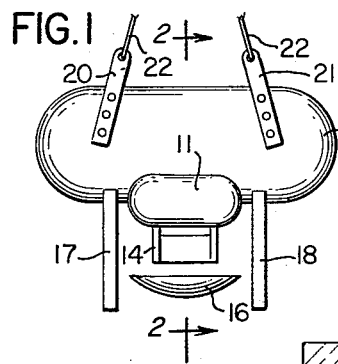
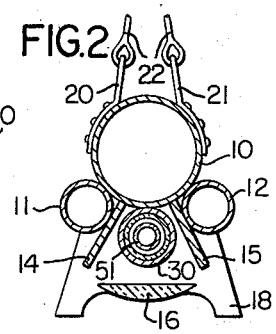
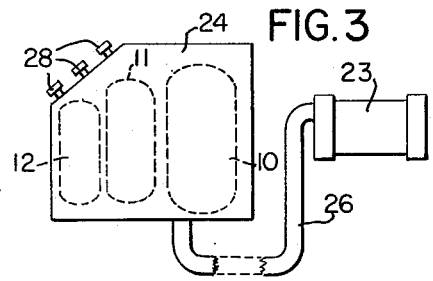
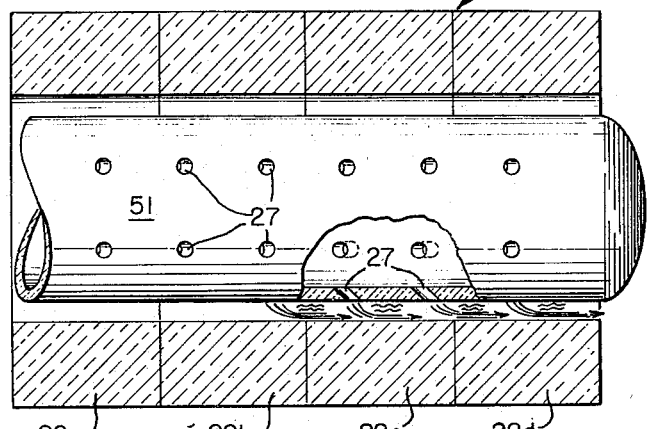
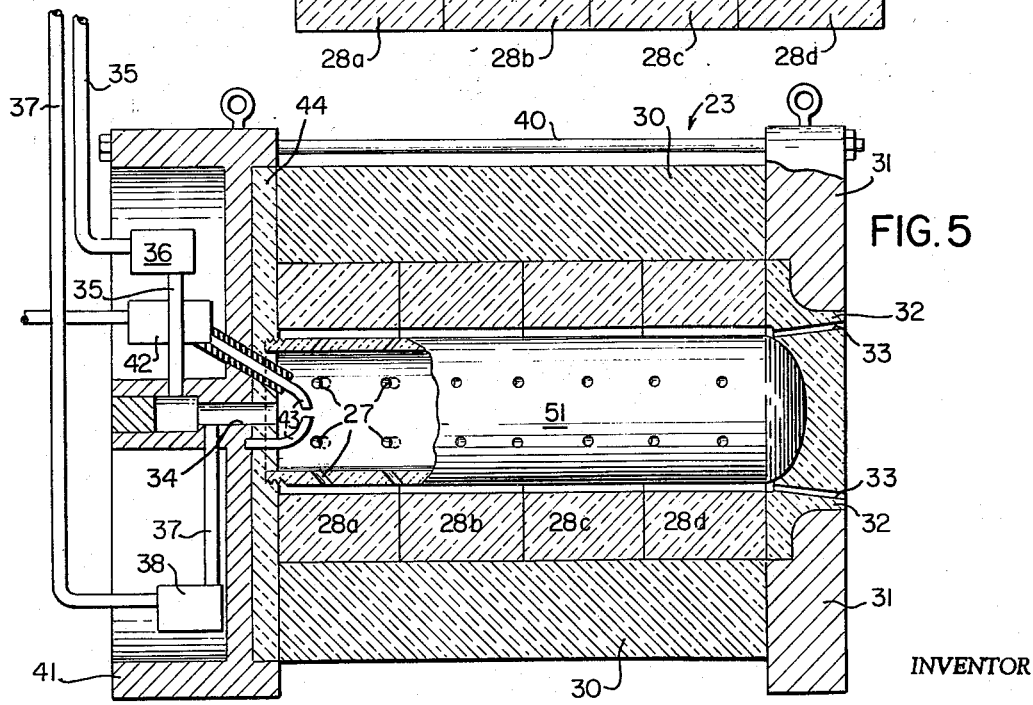
INVENTOR
STANLEY LEHRER
BY *Irving Kayton*
ATTORNEY

United States Patent Office 3,499,718
Patented Mar. 10, 1970

3,499,718
STEADY INTENSITY INCANDESCENT LIGHT SOURCE
Stanley Lehrer, Pompton Lakes, N.J., assignor to Astrosystems International, Inc.
Filed Nov. 3, 1967, Ser. No. 686,365
Int. Cl. F23m 1/00, 9/00
U.S. Cl. 431—4        10 Claims

ABSTRACT OF THE DISCLOSURE

Combustion temperatures are increased and light output enhanced and maintained at uniform intensity in a tubular combustion chamber by having the burning gases flow around a rod inside the chamber as the gases pass to an exhaust nozzle. The tubular chamber is formed in segments which are structurally supported by a surrounding and coaxial tube. The rod in its preferred construction is hollow and its wall perforated with a multiplicity of apertures. In solid rod embodiments either the rod is tapered and longitudinally moveable in the chamber or the flow rate of gases is controlled to increase with time during illumination.

BACKGROUND OF THE INVENTION

Field of the invention

This invention relates to a light source for producing intense illumination over a large area by introducing into, and igniting in, an elongated chamber having an exhaust port, a combustible mixture capable of producing sufficiently intense heat within the chamber to raise to incandescence certain materials in or on said chamber, or the chamber itself, or both. More particularly, this invention relates to means for increasing the intensity of the light produced by such an incandescent light source beyond that which has heretofore been possible, and also for extending for a greater period of time than has been thus far possible, the duration of time during which the intensity of the illumination is maintained steady and at its maximum or peak.

DESCRIPTION OF THE STATE OF THE ART

Patent 3,393,967 by Fleishman and Evans, entitled Light Source, there is described and claimed a light source capable of illuminating large land areas under airborne vehicles and adapted for simple, efficient mounting in and operation from the aircraft. The illumination of interest in that application, and in this, is that portion of the electromagnetic wave spectrum visible to the human eye, i.e., luminous flux, a quantity measured in lumens.

The Fleishman and Evans source comprises an optically transparent chamber or envelope of a material capable of withstanding intense heat, over 5000° F., without starting to boil (at pressures above atmospheric pressure) during the requisite operating period of the light source. Fused quartz is an example of such a material. The envelope may be, in one form, a tube or cylinder with a tapered exhaust nozzle at one end for combustion gases to escape. At the other end a fuel and oxidizer capable of producing intense heat, e.g., above 4000° F., is introduced and ignited. As a consequence the combustion products may be heated to incandescence as may the inside wall of the envelope. Moreover, materials may be introduced into the combustion chamber, i.e., the envelope, to further increase spectral emissivity in the visible regions. Such materials may be discrete emitters; in one form they may be one or more metallic oxides deposited on the inner surface of the combustion chamber.

It may be recognized that in such a light source, not only will light be transmitted through the optically transparent window, but so also will heat, especially infrared radiation. Since the visible to total radiation ratio is a direct function of temperature, other things being equal, it is desirable to reduce this external heat loss relative to the effective visible light output of the source for a given total energy input.

In my copending application of common assignee herewith for Incandescent Light Source, Ser. No. 655,025, filed July 21, 1967, there is disclosed and claimed means for enhancing the visible light output of the Fleishman et al. light source. This is done by decreasing the internal transverse cross-sectional area of the combustion chamber as by, for example, inserting a rod or pintle into the combustion chamber so as to extend along at least part of the envelope axis parallel to the combustion gas flow. The theory underlying visible light enhancement by this structure is that the decrease in cross-sectional area resulting from insertion of the pintle, which necessarily causes an increase in the combustion gas flow rate per unit cross sectional area through the envelope, results in increasing the surface coefficient of heat transfer along the inside surface of the combustion chamber. As a consequence, heat transfer normal to the surface, i.e., out of the light source, is increased. The inner surface temperature increase thus provided increases the visible to total radiation ratio provided. Moreover, because the rate of heat transfer is increased, there is a decrease in the time required for the light to reach its peak as contrasted with what would otherwise be the case.

In operation of light sources in accordance with the principles of the invention of my aforementioned copending patent application it became clear that although light intensity was enhanced, the intensity commenced to decrease from the peak attained although the light source otherwise was operating satisfactorily.

It is an object of the invention therefore to extend the duration of light enhancement obtained in the invention of my copending incandescent light source application.

SUMMARY OF THE INVENTION

Actual tests have demonstrated that light intensity and rate of intensity increase are a direct function of surface coefficient of heat transfer along the gas side surface of the combustion chamber. In tests of both the light sources of Fleishman et al. and my own copending application, a fused quartz chamber was used. At the temperature of operation it became clear that the inside quartz chamber surface was ablating and therefore the inside transverse cross-sectional area of the combustion chamber was increasing. It was recognized, therefore, in accordance with the sense of the invention that light intensity was decreasing because the enlarging transverse chamber area was decreasing the surface coefficient of heat transfer.

In accordance with the principles of this invention, therefore, the duration of maximum light intensity is lengthened by method and means which maintain constant the surface coefficient of heat transfer despite the ablation of the inner surface of the combustion chamber.

In a preferred embodiment of the invention a hollow rod of refractory material inside the combustion chamber has a multiplicity of perforations forming apertures in its wall to provide communication between the inside of the rod, wherein the burning gases are introduced, and the outside. The axes of the apertures are angled to provide a component of gas flow toward the exhaust end of the combustion chamber and a component normal to the inside surface of the combustion chamber. Heat transfer, in accordance with the principles of the invention, is primarily a function of the local impact of the gas jets on the inner surface of the quartz and the subsequent action of the impacting gas in its travel along the surface. Heat transfer, therebore, is no longer a primary function of the average gas velocity as determined by the annular gap between the hollow perforated rod and inner diameter of the quartz tube. The velocity of the jets through the apertures is a function of the pressure differential between the inside and outside of the rod. This differential is essentially independent of the change in annular gap area which results from ablation of the inner surface of the chamber. Hence, the impact of the gas jets is relatively insensitive to changes in the annular gap and the downstream component of gas flow velocity remains unchanged. The heat transfer, and consequently the quartz temperature and light output, therefore, is not affected by changes in the gap size.

BRIEF DESCRIPTION OF THE DRAWINGS

For a better understanding of the present invention, together with other and further objects thereof, reference is made to the following description taken in connection with the accompanying drawings. In the drawings:

FIG. 1 is a side view of a lamp housing mounted below fuel and oxidizer tanks;

FIG. 2 is a cross sectional view of the arrangement shown in FIG. 1 and is taken along line 2–2 of that figure;

FIG. 3 is alternate form showing a tank container and a control unit mounted exterior to the lamp which is connected to the control unit by a long supply cable;

FIG. 4 is a cross sectional view of a portion of the light source envelope showing a segmented envelope with a hollow rod or pintle with apertured wall inside the combustion chamber envelope; and FIG. 5 is a cross sectional view showing the details of the combustion chamber with the pintle mounting.

DESCRIPTION OF THE PREFERRED EMBODIMENT

Referring now to the drawings, FIG. 1 shows a large tank 10 which may hold an oxidizer such as gaseous or liquid oxygen. Mounted below tank 10 is a second tank 11 which holds a fuel, either gas or liquid. A third tank 12 may be mounted on the other side of the assembly and may hold other gases or fluids such as nitrogen for pressurizing the liquid fuel or visible light enhancing fluids, or both. The light source itself 13 is mounted directly below tank 10 and may be positioned between two reflectors 14 and 15. The reflectors help to intensify the light directed downwardly and they form a barrier which prevents the light source 13 from illuminating the airborne vehicle which is supporting the source. A lens 16 may be mounted below the reflectors, but this is not always necessary and may be omitted. Two or more supports 17 and 18 may be secured to tank 10 for supporting the arrangement on the ground prior to being airborne. One or more brackets 20 and 21 are secured to the tank 10 for support by cables 22 when the device is lowered from an airplane or helicopter during flight.

FIG. 3 shows the preferred arrangement whereby a light source 23 is provided with cables 22 with the three tanks 10, 11, and 12 housed within a compartment 24 having a control panel 25 for operation by an operator within the aircraft. The housing 24 is supported in the aircraft and is connected to the light source 23 by means of a cable 26, this cable including flexible conduits for transmission of the fluids and an electric transmission line for providing the spark plug with electrical energy for igniting the gas mixture.

FIG. 4 shows a combustion chamber or envelope in the form of four axially aligned fused quartz cylinders 28a, b, c and d. Disposed along and coaxial with the longitudinal axis of envelope 28 is a hollow graphite rod or pintle 51. The hollow rod is coaxial with the cylindrical surfaces of chamber 28. The wall of rod 51 is perforated to form a multiplicity of apertures 27 which permit the passage of gases from inside rod 51 to the annular volume in chamber 28 bounded by the inside surface of the chamber and the outside surface of rod 51. The axes of all of apertures 27 are other than normal to the wall of rod 51. With the direction left to right being the downstream direction of gas flow in chamber 28, the axis of each of the apertures 27 has a substantial downstream component.

Referring now to FIG. 5, the detailed construction of the light source is shown. Surrounding composite tube 28 is a single integral outer tube 30, also of fused quartz, which is designed to be a permanent transparent retaining tube. The inner composite tube 28, because of the high temperatures applied to it, may crack. The physical discreteness of the segments 28a, b, c and d tends to ensure disparate fissure or cracking patterns among the segments.

The exit end of the quartz tube is surrounded by a block of metal 31 forming a downstream support flange. An added liner 32 of refractory material such as graphite is mounted adjoining tube 28 and contains a plurality of nozzles 33 disposed circumferentially about liner 32 which permit the burned compounds to escape into the atmosphere. At the other end of the tube 28 a block 41 forming an upstream support flange, includes a mixing chamber 34 where the fuel and the oxidizer fluids are mixed or vaporized, or both, and then discharged into the interior of rod 51 where they are ignited and burn. The right hand closed end of 51 is supported in a receiving aperture in graphite liner 32. The mixing chamber 34 is connected by a first conduit 35 to a tank containing a fluid fuel. A variable solenoid valve 36 is mounted in series with conduit 35 so as to control the opening or closing of the supply line to the mixing chamber in series with a solenoid operated variable fuel valve 38.

The upstream flange 41 and the downstream flange 31 are mounted on either end of the combustion tube 28 and may be clamped together by any suitable means such as bolts 40. The mixing chamber and the valves 36, 38 are all mounted in a recess in terminal block 41. An insulating liner 44 is placed between the ends of the quartz cylinders and block 41. It may have an annular threaded recess to receive and support the threaded, open end of rod 51. Clearance may be allowed between the outside diameter of composite tube 28 and the internal diameter of outer tube 30 to accommodate the thermal expansion of segments 28a, b, c and d and any dimensional variation in those segments due to manufacturing tolerances. Similarly, axial clearance may be provided along the direction of the longitudinal axis of composite tube 28 between any adjacent segments, or the end segments and their adjacent flanges, or both.

Appropriate seals, not shown, are provided, in manner well known to those of skill in the art, to prevent the escape of combustion gases. These may be located, for example, in, on, or between flanges 31 and liner 44 and their respective contact zones on tube 30.

The operation of this type of light source is as follows: after being lowered from the aircraft, the valves 36 and 38 are opened by remote control and a mixture of inflammable fluid delivered to the volume defined by inner-surface of rod 51. At this point current is applied to the high tension coil 42 and the spark electrode 43 and a spark jumps across the gap to ignite the combustible mixture in rod 51. The burned gases pass from their point of ignition along the inside volume of rod 51, through apertures 27 and along the high velocity annular volume between tube 28 and rod 51. The gases are then ejected through the exit nozzles 33. The flame and gas raise the temperature of the inside surface of composite tube 28 and cause the quartz cylinder and rod 51 to light up. This action provides a brilliant light which may be applied to any large land area.

The advantageous operation of rod 51, from the theoretical viewpoint presented below, is due to its effect on the heat radiated away from the inner surface of envelope 28 and through and out of envelope 30. For a given gas temperature, as explained in my aforementioned copending application, the only effective way from a light enhancement viewpoint, to drive the inside surface of the quartz envelope 28 to higher temperatures is to increase the gas side coefficient of heat transfer. The equation for the heat transfer coefficient is:

$$h_o = 584 \frac{g^{0.8}}{d^{0.2}} \text{ B.t.u./hr./sq. ft./}° \text{ F.}$$

where $g$ is the flow rate per unit cross sectional area (lb./sq. in./sec.), $d$ is the passage diameter (inches). For a flow rate of 0.5 lb./sec. and a diameter of 5 inches (an actual dimension in one reduction to practice), then:

$$h_o = 584 \frac{0.5^{0.8}}{5.0^{0.2}} = 22.5 \text{ B.t.u./sq. ft./hr./}° \text{ F.}$$

This figure increases with a decrease in cross-sectional area or a decrease in $d$ as was done in my aforementioned copending application by inserting a pintle in the combustion chamber such as that of the aforementioned Fleishman et al. application. The resulting gas flow passage is annular. For annular passageways $d$ is replaced by an equivalent diameter $d_e$ which equals the difference in the diameters of the inside of the quartz cylinder 28 and the pintle 51, i.e., $d_e = d_2 - d_1$.

For a pintle of 3 inches diameter which leaves a one inch annular gap in a 5 inch internal diameter tube, $h_c = 38.4$ B.t.u./sq. ft./hr./° F., and, for a four inch plug, leaving an annular gap of 0.5 inch, $h_c = 70.5$ B.t.u./hr./sq. ft./° F. With a 4.5 inch diameter plug, leaving an annular gap of only 0.25 inch, $h_c = 345$ B.t.u./hr./sq. ft./° F. The required heat may be transferred to the quartz from the hot gas in this way provided a small gap is maintained.

In the embodiment of the invention disclosed herein in FIG. 5, the hollow perforated rod 51 similarly performs the function, inter alia, of effectively though not literally decreasing $d_e$ and thus raising the visible light intensity produced. With operation of the light source, however, the inner surface of tube 28 tends to ablate at the operating temperature. With ablation, the effective diameter tends to increase; light intensity would decrease, therefore, except for the effect of the jets of combustion gases that pass through apertures 27 and strike the ablating inner surface of chamber 28 as is shown in FIG. 4.

In FIG. 4, the many directed jets of hot gas through apertures 27 impinge on the quartz surface of tube 28 to provide stagnation heat transfer conditions in a multiplicity of zones. This can be seen to result from the tendency to recirculate that each jet has when encountering the orthogonal component of gas flow in the next downstream jet. Thus a layer of relatively stagnant gas may exist near the surface of tube 51 while active and high velocity gas flows along the inner wall of chamber 28 as represented by the arrowed components shown in FIG. 4. This effect is independent of physical gap size between the hot gas nozzles 27 and the quartz surface. Increase in the size of this physical gap by ablation of the quartz wall (the refractory rod does not ablate at the operating temperature) simply results in a greater thickness of the layer of relatively stagnant gas. The effective diameter, $d_e$, therefore remain the same even as ablation progresses. As a consequence, the enhanced light intensity produced is maintained. Moreover, the refractory rod 51 may be incandescent to some extent and contribute to the light output in a manner described in greater detail in a copending application of Robert Strauss, Ser. No. 680,398, filed of even date herewith and of common assignee.

Another embodiment that may approximate maintaining the actual gap size constant during ablation involves the use of an unperforated rod slightly tapered over its length. In this embodiment the inner wall of the combustion tube is also tapered complementary to that of the rod. The rod is adapted to be movable within the tube and is advanced therein as needed to maintain the gap size during the operation of the tube.

In the embodiments of the invention thus far discussed, attention has been directed to the parameter of effective diameter in order to maintain constant the heat transfer coefficient, $h_c$. Another parameter that clearly affects $h_c$, however, is the flow rate, $g$, of the combustion gases. Since $g$ is in the numerator and $d_e$ is in the denominator of the $h_c$ equation, it is clear that an increase in flow rate will offset an increase in effective diameter. Increase in flow rate may readily be provided by the process of varying the setting of the solenoid fuel valve 38. This increase in fuel flow rate may be accomplished gradually (and automatically) as a function of time during operation of the light source thereby directly offsetting the effect of ablation of the inner surface of the quartz chamber.

The foregoing disclosure and drawings are merely illustrative of the principles of the invention and are not to be interpreted in a limiting sense.

What I claim as my invention, is:

1. An incandescent light source comprising:
   (a) an elongated combustion chamber comprising a wall of material that is ablative and incandescent over a part of the temperature range of operation of said light source;
   (b) means for introducing and sustaining burning gases in said combustion chamber;
   (c) exhaust means at an exhaust end of said combustion chamber for exhausting said burning gases; and
   (d) means comprising a hollow, apertured rod for maintaining the heat transfer coefficient constant along the inside surface of said chamber constant with respect to time during the operation of said source in that part of said temperature range in which said material of said wall is ablative and incandescent, the incandescence of said wall being visible from the exterior of said chamber.

2. An incandescent light source as recited in claim 1 wherein said hollow rod is of refractory material closed at one end, having a multiplicity of apertures in its wall and disposed longitudinally within and coaxial to said elongated chamber, said closed end of said rod being disposed adjacent to said chamber exhaust means, and the other end of said rod positioned in said chamber relative to said burning gas introducing means to receive burning gas within said hollow rod.

3. An incandescent light source as recited in claim 2 wherein the axis of each of said apertures has a directional component parallel to and a directional component normal to the axis of said rod.

4. An incandescent light source as recited in claim 1 wherein said heat transfer coefficient maintaining means comprises means for increasing the flow rate of burning gases within said chamber during the operation of said light source in that part of said temperature range in which said material of said chamber is ablative.

5. The method of maintaining constant the visible light intensity of a light source having a combustion chamber for supporting and transferring burning gases wherein the material of said chamber ablates due to the supporting and burning of said gases, comprising the steps of: increasing the flow rate of said burning gases transferred through said chamber as said material ablates; and directing said burning gases in jets towards and along the ablating material.

6. An incandescent light source, comprising:
   (a) a hollow cylindrical combustion chamber comprising an exterior of fused quartz and an exhaust nozzle at one end;
   (b) a hollow graphite rod disposed coaxially within said chamber, said rod being closed at the end adjacent said exhaust nozzle; and (c) a multiplicity of apertures in the wall of said hollow rod.

7. An incandescent light source as recited in claim 6, wherein the axis of each of said apertures includes a component normal and a component parallel to the axis of said hollow rod.

8. An incandescent light source as recited in claim 7 wherein the part of each of said multiplicity of apertures perforating the outside surface of said rod is closer to said exhaust nozzle than the part of that aperture perforating the inside surface of said hollow rod.

9. An incandescent light source as recited in claim 8 including means for introducing burning gases into said hollow rod at the end opposite to that adjacent to said exhaust nozzle.

10. An incandescent light source as recited in claim 9 wherein said multiplicity of apertures in said rod direct said burning gases passing through said apertures in the direction of said exhaust nozzle.

References Cited

UNITED STATES PATENTS

| 1,735,945 | 11/1929 | Wollaston | 110—97 |
| 3,141,741 | 7/1964 | Hoel et al. | 431—4 X |
| 3,187,798 | 6/1965 | Pokorny | 431—347 X |
| 3,384,442 | 5/1968 | Stewart et al. | 431—347 X |
| 3,393,967 | 7/1968 | Fleishman et al. | 431—158 |

FREDERICK L. MATTESON, JR., Primary Examiner

ROBERT A. DUA, Assistant Examiner

U.S. Cl. X.R.

431—158, 347